United States Patent [19]

Langpape et al.

[11] Patent Number: 4,683,179
[45] Date of Patent: Jul. 28, 1987

[54] ELECTROCHEMICAL STORAGE CELL

[75] Inventors: Reinhart Langpape, Schönau; Wolfgang Dörrscheidt, Helmstadt; Jean-Philippe Roze, Wiesloch; Günther Steinleitner, Schriesheim, all of Fed. Rep. of Germany

[73] Assignee: Brown, Boveri & Cie AG, Mannheim/Käfertal, Fed. Rep. of Germany

[21] Appl. No.: 935,079

[22] Filed: Nov. 24, 1986

Related U.S. Application Data

[63] Continuation of Ser. No. 799,632, Nov. 19, 1985, abandoned.

[30] Foreign Application Priority Data

Nov. 24, 1984 [DE] Fed. Rep. of Germany ....... 3442936

[51] Int. Cl.$^4$ .................................. H01M 10/39
[52] U.S. Cl. .................................. 429/104
[58] Field of Search .................................. 429/104

[56] References Cited

U.S. PATENT DOCUMENTS

| 4,049,884 | 9/1977 | Desplanches et al. | 429/104 |
| 4,052,535 | 10/1977 | Robinson et al. | 429/104 |
| 4,117,208 | 9/1978 | Ludwig | 429/104 |
| 4,166,156 | 8/1979 | Ludwig | 429/104 |
| 4,360,575 | 11/1982 | Brennan | 429/104 |

Primary Examiner—Donald L. Walton
Attorney, Agent, or Firm—Herbert L. Lerner; Laurence A. Greenberg

[57] ABSTRACT

Electrochemical storage cell of the sodium and sulfur type with an anode space and a cathode space which are separated from each other by a solid electrolyte and are bounded, at least in some regions, by a metallic housing. The cathode space contains the sulfur electrode which is made of a sulfur-impregnated graphite or carbon fiber material and the cathode space is subdivided into at least two and preferably more sectors which are separated from each other at least in some regions.

3 Claims, 4 Drawing Figures

ELECTROCHEMICAL STORAGE CELL

This application is a continuation of application Ser. No. 799,632, filed Nov. 19, 1985, now abandoned.

BACKGROUND OF THE INVENTION

1. Field of the Invention

The invention relates to an electrochemical storage cell of the sodium and sulfur type with an anode and a cathode space which are separated from each other by a solid electrolyte and are bounded, at least in some regions, by a metallic housing. The cathode contains a sulfur electrode which is made of a sulfur-impregnated graphite or carbon fiber material.

2. Description of the Prior Art

Such electrochemical storage cells are highly suited as energy sources. They find application increasingly in the construction of storage batteries which are provided for the power supply of electric vehicles.

A specific example for these storage cells are those of the sodium and sulfur type, which are rechargeable and comprise a solid electrolyte of beta-aluminum oxide which separates the anode space from the cathode space. It is an advantage of these storage cells that no electrochemical secondary reactions take place during the charging. The reason for this is that only sodium ions can get through the solid electrolyte. The current yield of such sodium/sulfur storage cells is therefore near 100%. In these electrochemical storage cells the ratio of energy content to the total weight of the storage cell is very high as compared with lead storage cells since the reactants are light and much energy is released in the electrochemical reactions.

Besides the anode space which is filled with sodium, such a storage cell comprises a cathode space which is arranged in a normal storage cell between the metallic housing delineating the storage cell from the outside and the solid electrolyte. In all known storage cells, this cathode space is filled with a long-fiber graphite felt which is impregnated with sulfur. In the manufacture of the storage cells, two half shell-shaped elements are preferably formed, impregnated with sulfur and then inserted into the cathode space. The storage cells are manufactured at room temperature. For operation, the storage cells must be heated to a temperature of 350° C. If a storage cell is exposed to such a temperature influence, the graphite felt expands as do, in particular, the two half-shells which are arranged in the cathode space. They expand until their end faces abut each other flush and the fibers of the one half extend beyond those of the other half, so that no space is left any more in the boundary region of the half-shells. During the discharge of storage cells, the sodium ions contained in the anode space migrate through the solid electrolyte into the cathode space and with the sulfur present form sodium polysulfide there. Due to the fact that the two half-shells formed of graphite felt now are close and touch each other, the sodium polysulfide can be distributed uniformly in the entire cathode space, especially also over the boundary surfaces of the two half-shells. If such a storage cell which contains appreciable amounts of sodium polysulfide in the cathode space, is cooled down, the sodium polysulfide solidifies to form a closed ring which firmly surrounds the solid electrolyte. The sodium polysulfide has a thermal coefficient of expansion higher than that of the solid electrolyte which is made of beta-aluminum oxide. This means that the ring formed of sodium polysulfide is shrunk onto the solid electrolyte when it gets cold. Thereby, it adheres very firmly to the outside surface of the solid electrolyte and exerts shear forces on the same in the event of temperature changes, which is caused by the different thermal coefficients of expansion of the two materials. These shear forces lead eventually to the formation of cracks in the solid electrolyte and thus to the destruction of the entire storage cell.

SUMMARY OF THE INVENTION

It is an object of the invention to provide an electrochemical storage cell, in which the action of destructive forces on the solid electrolyte resulting from solidification of surrounding sodium polysulfide is permanently prevented.

With the foregoing and other objects in view, there is provided in accordance with the invention, an electrochemical storage cell of the sodium and sulfur type with an anode space and a cathode space which are separated from each other by a solid electrolyte and are bounded, at least in some regions, by a metallic housing, the cathode space containing a sulfur electrode which is made of a sulfur-impregnated graphite or carbon fiber material, and the cathode space subdivided into a plurality of sectors which are separated from each other at least in some regions.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DESCRIPTION OF THE PREFERRED EMBODIMENTS

In electrochemical storage cells of the sodium and sulfur type, sodium polysulfide is formed in the cathode space when the storage cell is being discharged. The former is liquid as long as the storage cell is at its operating temperature. However, if it is cooled down below 100° C., the sodium polysulfide forms a solid ring around the solid electrolyte which is additionally reinforced by the graphite fibers located in the cathode space, so that it exerts very large shear forces on the solid electrolyte. To prevent the formation of such a ring, the cathode space is subdivided, according to the invention, into a plurality of sectors. The latter are separated from each other by spacers.

By the subdivision of the cathode space, according to the invention, especially the subdivision of the sulfur electrode, into two or more sectors which are separated from each other by additional plates, the formation of a coherent ring of sodium polysulfide is prevented. Thereby, the sodium polysulfide solidifies only in the form of sections. Through the use of additional spacers, the formation of a coherent layer of sodium polysulfide which could narrow the solid electrolyte, is prevented. When spacers are used for separating the sectors from each other, a material is preferably used which can be wetted by sodium polysulfide only with difficulty. Alpha-aluminum oxide is particularly well suited for this purpose.

The invention will be explained in the following by means of drawings.

Figure 1:
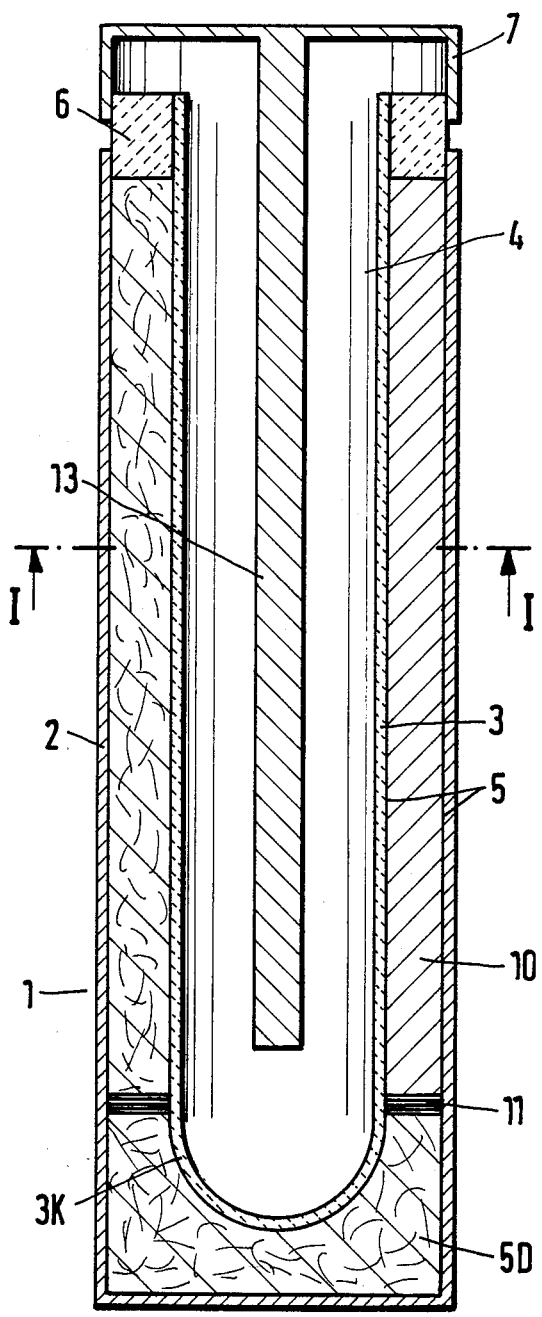
FIG. 1 shows a vertical cross section through an electrochemical storage cell in accordance with the invention, FIG. 2, a horizontal section through the storage cell taken along line I—I of FIG. 1.
Figure 2:
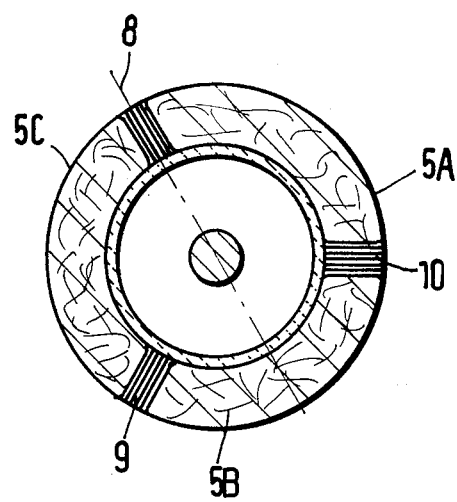

The storage cell 1 shown in FIG. 1 is bounded from the outside by a metallic housing 2 which, in the embodiment example shown here, is cup-shaped. The inside surfaces of the metallic housing 2 are provided with corrosion protection (not shown here). The likewise cup-shaped solid electrolyte 3 is arranged in the interior of the metallic housing 2. Its interior serves as the anode space 4 and is filled with sodium. The dimensions of the solid electrolyte are chosen such that a coherent space remains between its outside surfaces and the inside surfaces of the metallic housing 2, which space serves as the cathode space 5. A pressure ring 6 is attached at the upper end of the solid electrolyte 3 by means of glass solder. Seal rings are conventionally non-metallic made of such materials as alpha alumina. Part of pressure ring 6 is connected gas-tight to the inside surface of the housing 2 and the closing cap 7 of the storage cell 1, thereby sealing the storage cell 1 tightly from the outside. The cathode space 5 which is arranged between the solid electrolyte 3 and the metallic housing, and in particular, the sulfur electrode arranged therein, is subdivided into several sectors, according to the invention. In the embodiment example, of which a horizontal section can be seen in FIG. 2, the portion of the cathode space 5 extending parallel to the longitudinal axis of the solid electrolyte is subdivided into three sectors 5A, 5B and 5C. These are filled with pieces of graphite felt which are impregnated with sulfur. As can be seen in FIG. 2, the sectors are separated from each other by spacers 8, 9 and 10. The spacers 8, 9 and 10 are arranged radially. Their width is designed so that they adjoin flush the solid electrolyte 3 as well as the inside surface of the metallic housing 2. The lengths of the spacers 8, 9 and 20 are chosen so that they correspond to the lengths of the sectors 5A, 5B and 5C which extend from the dome region 3K of the solid electrolyte 3 to slightly below the pressure ring 6.

As is further shown in FIG. 1, the portion of the cathode space 5 which is arranged about the dome 3K of the solid electrolyte, is likewise separated from the rest of the region, so that a further sector 5D exists which is separated from the sectors 5A, 5B and 5C by an annular spacer 11. The spacer 11 is designed so that it adjoins with its outer edge the metallic housing 2 and on the inside is directly adjacent to the solid electrolyte 3. The spacers 8, 9, 10 and 11 used for separating the sectors 5A, 5B, 5C and 5D are made of material which is wetted by sodium polysulfide only with difficulty. Alpha-aluminum oxide is particularly well suited for this purpose.

In the embodiment example shown here, the metallic housing 2 is used as the cathodic current collector. The anodic current collector is formed by a metal or graphite rod 13 which protrudes far into the interior of the solid electrolyte 3 and is connected to the inside of the metallic closing cap 7 in an electrically conducting manner, such that the outside surface of the closing cap 7 can be used as an electric terminal element.

Figure 3:
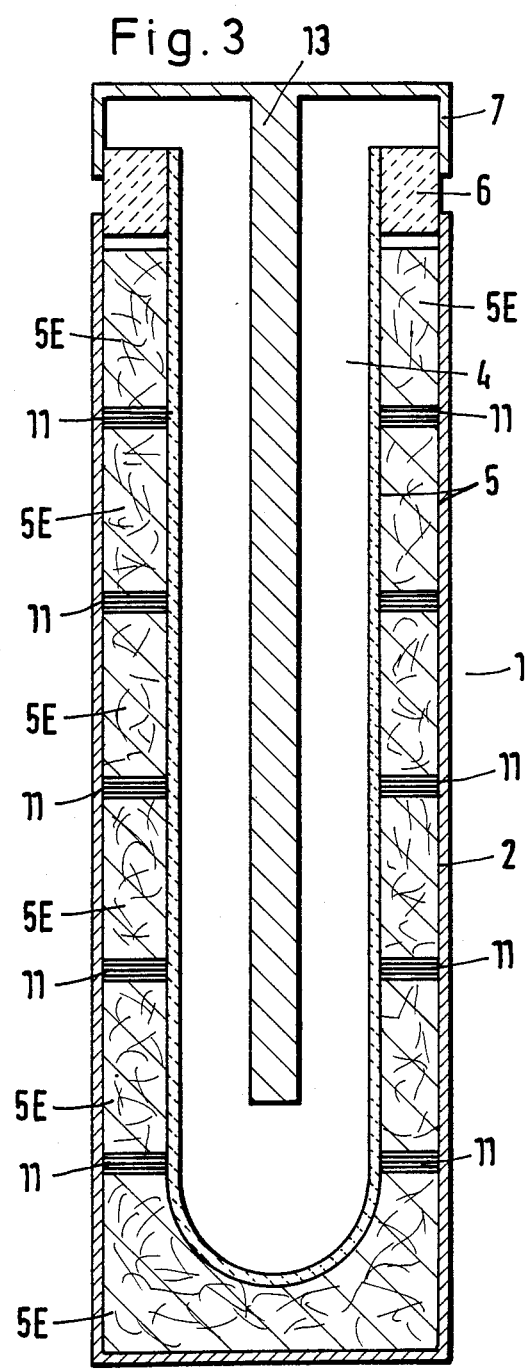
FIG. 3 is a variant of the storage cell according to the invention.

FIG. 3 shows a variant of the embodiment example depicted in FIGS. 1 and 2. The storage cell 1 is bounded against the outside by a metallic housing 2 in the form of a cup. In the housing 2 is arranged a solid electrolyte 3 with dimensions such that the cathode space 5 is formed between the metallic housing 2 and the solid electrolyte 3, while the anode space 4 extends in the interior of the solid electrolyte 3. As shown in FIG. 3, the cathode space is subdivided in this embodiment example into several sectors, particularly into six sectors 5E. The latter are filled with annular graphite pieces which are arranged vertically one below the other, with two adjacent graphite rings being separated from each other by an annular spacer 11. The annular spacers 11 are arranged perpendicularly to the longitudinal axis of the solid electrolyte and are made of a material which is hard to wet by sodium polysulfide. The height of each graphite ring 5E corresponds approximately to one-sixth of the total height of the metallic housing 2. The graphite rings 5E are inserted into the cathode space 5.

Graphite rings 5E before insertion into cathode space are formed from graphite fibers by appropriate molding and are additionally impregnated with sulfur. Each graphite ring 5E can be made in the form of two halves and subsequently inserted into the cathode space 5.

Figure 4:
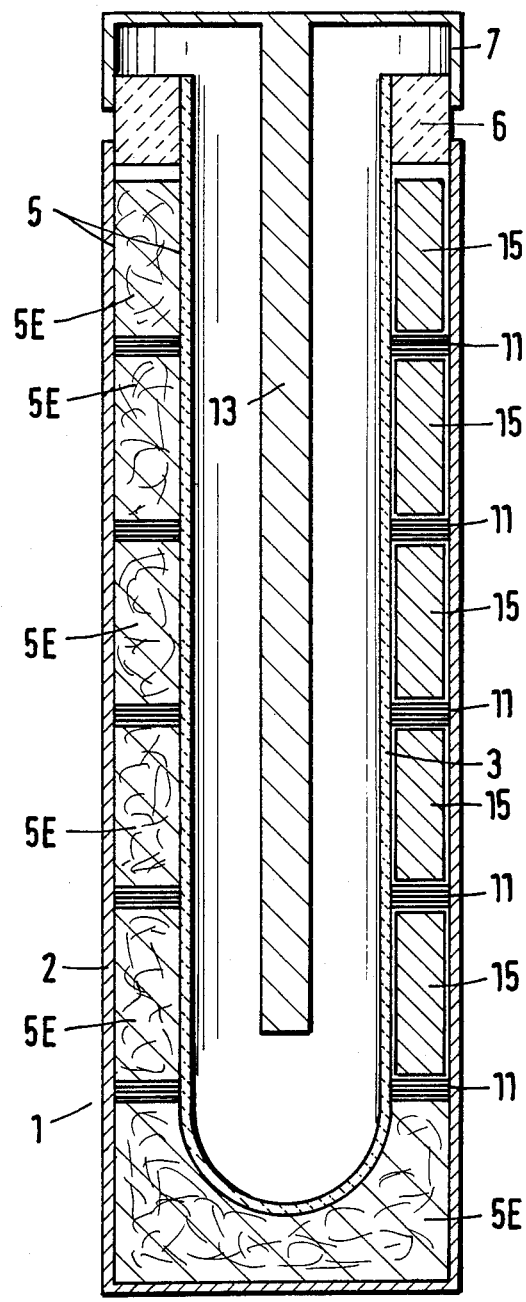
FIG. 4 is a further embodiment of the storage cell.

The embodiment shown in FIG. 4 of the storage cell is, except for the cathode space 5, similar to the storage cell 1 shown in FIG. 3 and explained in the corresponding description. Several graphite rings 5E are arranged vertically one below the other within the cathode space, and every two successive graphite rings are separated from each other by an annular spacer 11. These spacers are designed and arranged like the spacers shown in FIG. 3. Deviating from the embodiment example shown in FIG. 3, each graphite ring 5E is composed of two halves with the end faces of the two halves again separated by a spacer 15. The latter are arranged radially and are designed so that they adjoin flush the solid electrolyte 3 and the inside surface of the metallic housing. Their height is matched to the height of the respective graphite rings 5E.

The foregoing is a description corresponding, in substance, to German application P No. 34 42 936.0, dated Nov. 24, 1984, international priority of which is being claimed for the instant application and which is hereby made part of this application. Any material discrepancies between the foregoing specification and the specification of the aforementioned corresponding German application are to be resolved in favor of the latter.

There is claimed:

1. Electrochemical storage cell of the sodium and sulfur type with an anode space and a cathode space which are separated from each other by a solid electrolyte and are bounded, at least in some regions, by a metallic housing, the cathode space containing a sulfur electrode which is made of a sulfur-impregnated graphite or carbon fiber material and the cathode space is subdivided in the region of the lateral boundary surface of the solid electrolyte into at least two sectors which extend parallel to the longitudinal axis of the solid electrolyte and extend along the entire lateral boundary of the solid electrolyte and are separated from each other by spacers which are arranged radially with their narrow sides adjacent ot the solid electrolyte and to the inside surfaces of the metallic housing and the region of the cathode space around the dome of the solid electrolyte is separated from the remaining region of the cathode space by a spacer arranged perpendicularly to the longitudinal axis of the solid electrolyte and wherein all the spacers are made of alpha aluminum oxide.

2. Electrochemical storage cell of the sodium and sulfur type with an anode space and a cathode space which are separated from each other by a solid electrolyte and are bounded, at least in some regions, by a metallic housing, the cathode space containing a sulfur electrode which is made of a sulfur-impregnated graphite or carbon fiber material and the cathode space is subdivided into a plurality of ring-shaped sectors wherein each two successive sectors are separated by a ring-shaped spacer which is perpendicular to the longitudinal axis of the solid electrolyte and each annular sector is subdivided into at least two halves, the adjoining end faces of which are separated by spacers arranged perpendicularly to the longitudinal axis of the solid electrolyte with the narrow sides of the spacers adjoining the inside surfaces of the metallic housing.

3. Electrochemical storage cell of the sodium and sulfur type with an anode space and a cathode space which are separated from each other by a solid electrolyte and are bounded, at least in some regions, by a metallic housing, the cathode space containing a sulfur electrode which is made of a sulfur-impregnated graphite or carbon fiber material and the cathode space is subdivided into a plurality of ring-shaped sectors wherein each two successive sectors are separated by a ring-shaped spacer of alpha aluminum oxide which is perpendicular to the longitudinal axis of the solid electrolyte, and each annular sector is subdivided into at least two halves, the adjoining end faces of which are separated by spacers arranged perpendicularly to the longitudinal axis of the solid electrolyte with the narrow sides of the spacers adjoining the inside surfaces of the metallic housing.

* * * * *